United States Patent [19]

Usui et al.

[11] Patent Number: 4,626,420

[45] Date of Patent: Dec. 2, 1986

[54] SYNTHETIC FRAIPONTITE AND PROCESS FOR PREPARATION THEREOF

[75] Inventors: Koichi Usui, Hoya; Teiji Sato; Masanori Tanaka, both of Shibata; Yasuo Mizoguchi, Osaka; Noriyuki Takahashi, Nakajo, all of Japan

[73] Assignee: Mizusawa Industrial Chemicals, Ltd., Tokyo, Japan

[21] Appl. No.: 747,273

[22] Filed: Jun. 21, 1985

[30] Foreign Application Priority Data

Jun. 22, 1984 [JP] Japan .................................. 59-127569

[51] Int. Cl.$^4$ ............................................. C01B 33/20
[52] U.S. Cl. ..................................... 423/326; 423/327
[58] Field of Search ........................................ 423/326

[56] References Cited

FOREIGN PATENT DOCUMENTS 0165647 12/1985 European Pat. Off. ............ 423/326

Primary Examiner—John Doll
Assistant Examiner—Jackson Leeds
Attorney, Agent, or Firm—Sherman and Shalloway

[57] ABSTRACT

An oxide or hydroxide mixture or coprecipitate having a three-component oxide composition comprising 5 to 45 mole % of $SiO_2$, 35 to 65 mole % of ZnO and 0 to 60 mole % of $Al_2O_3$ is heated in the presence of water to form a crystal of the fraipontite type.

The obtained synthetic mineral has a fraipontite type crystal structure and has a high whiteness and a large specific surface area. For example, this synthetic mineral is valuable as a color developer for a leuco dye.

18 Claims, 6 Drawing Figures

SYNTHETIC FRAIPONTITE AND PROCESS FOR PREPARATION THEREOF

BACKGROUND OF THE INVENTION (1) Field of the Invention

The present invention relates to a synthetic fraipontite type mineral and a process for the preparation thereof.

(2) Description of the Prior Art

Fraipontite has a chemical composition represented by the formula of $8ZnO\cdot 2Al_2O_3\cdot 5SiO_2\cdot 11H_2O$, and it is known that fraipontite is an asbestos-like mineral having a yellowish white color and a silky gloss and having a shell composed of a fibrous crystal. It is said that this mineral was produced at a mine located at Vieille-Montagne, Belgium. However, it is generally admitted that the producing place of this mineral is unknown. So far as we know, none have succeeded in synthesizing this mineral.

SUMMARY OF THE INVENTION

It is a primary object of the present invention to provide a synthetic fraipontite type mineral and a process for the preparation thereof.

Another object of the present invention is to provide synthetic fraipontite having a high whiteness and a large specific surface area and a process for the preparation thereof.

Still another object of the present invention is to provide synthetic fraipontite valuable as a color developer for a leuco dye and a process for the preparation thereof.

Still another object of the present invention is to provide a synthetic mineral in which the fraipontite type crystal structure is well developed and a process for the preparation thereof.

Still another object of the present invention is to provide a fraipontite type novel synthetic mineral of the lamellar plate crystal system having an excellent whiteness and a relatively large specific surface area and a process for the preparation thereof.

A further object of the present invention is to provide a process in which a synthetic fraipontite type mineral can be prepared from easily available starting materials without any troublesome operation.

More specifically, in accordance with the present invention, there is provided a process for the preparation of a synthetic fraipontite type mineral, which comprises heating an oxide or hydroxide mixture or coprecipitate having a three-component oxide composition comprising 5 to 45 mole% of $SiO_2$, 35 to 65 mole% of ZnO and 0 to 60 mole% of $Al_2O_3$ in the presence of water to form a fraipontite type crystal by crystallization.

Furthermore, in accordance with the present invention, there is provided a crystalline synthetic fraipontite type mineral composed of zinc phyllosilicate or aluminum-containing zinc phyllosilicate, which has an X-ray diffraction pattern of the fraipontite type, a Hunter whiteness of at least 80% and a specific surface area of at least 10 m²/g.

DETAILED DESCRIPTION OF THE PREFERRED EMBODIMENTS

The present invention will now be described in detail.

STRUCTURE AND CHARACTERISTICS OF SYNTHETIC FRAIPONTITE

The synthetic fraipontite of the present invention is composed mainly of zinc phyllosilicate or aluminum-containing zinc phyllosilicate having a two-layer structure, and the basic skeleton of the synthetic fraipontite of the present invention consists of a two-layer structure comprising a layer of a tetrahedron of $SiO_4$ and a layer of an octahedron of $ZnO_6$ laminated to each other, in which a part of Si of the tetrahedron of $SiO_4$ is substituted with Al and in order to conform to the valency of this Al, a part of Zn of the octahedron of $ZnO_6$ is substituted with Al.

The basic chemical structure of this synthetic fraipontite is given by the following formula:

$$(Zn_{3-x}Al_x)(Si_{2-x}Al_x)O_5(OH)_4 \quad (1)$$

wherein x is a value of from 0 to 1.75, especially from 0.3 to 1.0.

In naturally produced fraipontite, the value of x is about 0.65, but in the product of the present invention, it is clear that the value of x can be changed in a considerably broad range.

In the synthesis of fraipontite, crystalline synthetic fraipontite is easily formed in the range defined by the above composition formula, especially the case of a composition close to that of natural fraipontite. Namely, if the three-component oxide composition comprises 5 to 40 mole% of $SiO_2$, 35 to 65 mole % of ZnO and 0 to 60 mole%, especially 2 to 60 mole%, of $Al_2O_3$, a phyllosilicate mineral having a fraipontite type crystal structure can be obtained.

According to the present invention, various synthetic fraipontites differing in the crystallization degree can be obtained under synthesis conditions described hereinafter, and these synthetic fraipontites have an X-ray diffraction pattern which is substantially the same as that of natural fraipontite.

According to the ASTM Card published in 1974, the X-ray diffraction pattern of natural fraipontite is as shown in Table A given below.

TABLE A

| Spacing dx (Å) | Relative Intensity I/Io |
|---|---|
| 7.00 | 100 |
| 3.52 | 70 |
| 2.63 | 30 |
| 2.48 | 20 |
| 2.36 | 20 |
| 2.25 | 10 |
| 2.12 | 10 |
| 1.99 | 10 |
| 1.76 | 10 |
| 1.65 | 10 |
| 1.53 | 20 |

Synthetic fraipontite prepared according to the synthesis process (I) described hereinafter is clearly distinguishable over natural fraipontite in that the synthetic fraipontite is microcrystalline. This synthetic fraipontite of the present invention prepared according to the synthesis process (I) generally has an X-ray diffraction pattern shown in Table B given below.

TABLE B

| Spacing dx (Å) | Relative Intensity I/Io |
|---|---|
| 8.4–6.4 | 40–70 |
| 3.9–3.5 | 40–70 |
| 2.7–2.6 | 100 |
| 2.5–2.4 | 50–80 |
| 1.6–1.5 | 50–80 |

Figure 1:
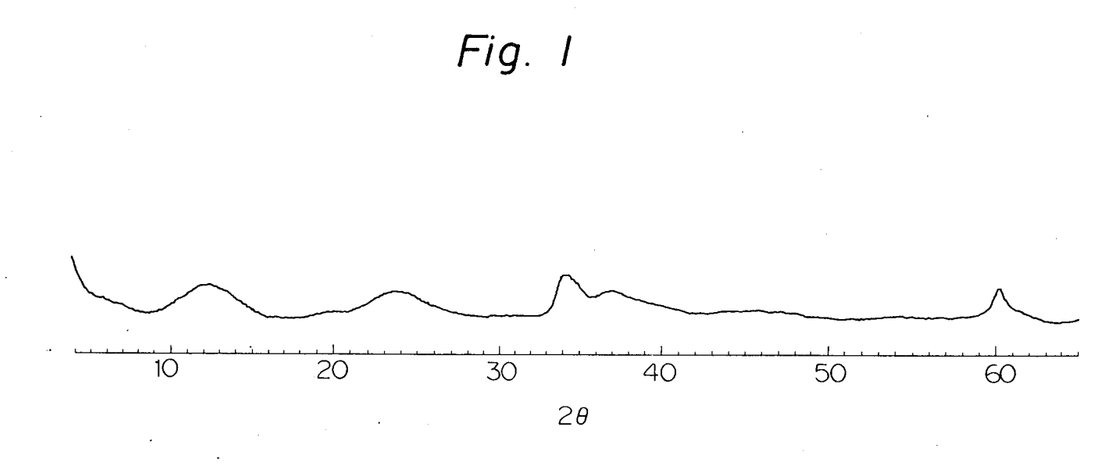
FIG. 1 shows an X-ray diffraction spectrum by Cu-Kα rays of aluminum-containing zinc phyllosilicate of the fraipontite type prepared in Example 1 of the present invention.

FIG. 1 of the accompanying drawings shows an X-ray diffraction spectrum of microcrystalline synthetic fraipontite prepared according to the synthesis process (I).

In natural fraipontite, the diffraction peak at a spacing d of 7.0 Å, that is, the diffraction peak of the plane index (001), is strongest, and basic two-layer structures are regularly laminated in the direction of the axis C. In contrast, in the microcrystalline synthetic fraipontite prepared according to the synthesis process (I), the diffraction peak of the plane index (001) is broad and covers the range of d=8.4–6.4 Å, and it is seen that development of crystals in the direction of the axis C is weak and there is present a considerably broad space between two adjacent layers.

Since zinc phyllosilicate or aluminum-containing zinc phyllosilicate of the fraipontite type prepared according to the synthesis process (I) has a fine and loose crystal structure, it has a large specific surface area not observed in ordinary phyllosilicates of the two-layer structure. Namely, the BET specific surface area is at least 100 m²/g, especially at least 150 m²/g.

Figure 2:
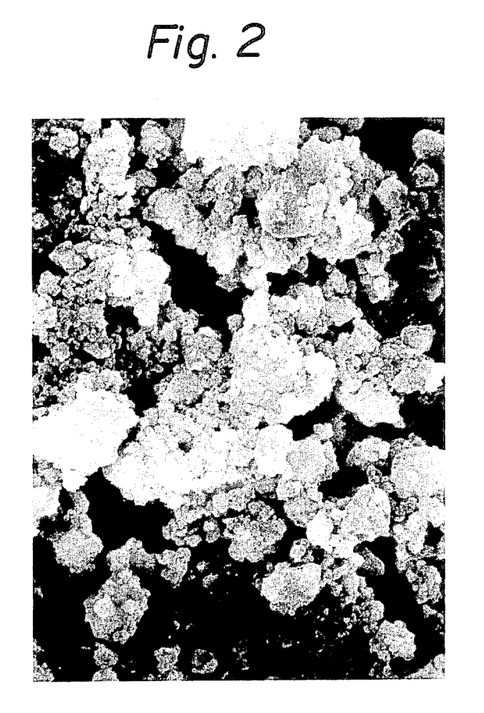
FIG. 2 is a scanning type electron microscope photograph (10,000 magnifications) showing the particle structure of aluminum-containing zinc phyllosilicate of the fraipontite type prepared in Example 1 of the present invention.

It is considered that the synthetic fraipontite prepared according to the synthesis process (I) consists of fine plate crystals, but the particle shape is irregular. FIG. 2 of the accompanying drawings is a scanning type electron microscope photograph showing the particle structure of this synthetic fraipontite.

The particle size of this synthetic fraipontite varies in a considerably broad range, and generally, the median diameter determined according to the centrifugal sedimentation method is 0.1 to 100 μm, and especially 0.5 to 20 μm.

In synthetic fraipontite prepared according to the synthesis process (II) of the present invention described hereinafter, the crystal structure is somewhat developed, as compared with the crystal structure of the synthetic fraipontite prepared according to the synthesis process (I). This synthetic fraipontite prepared according to the synthesis process (II) has an X-ray diffraction pattern shown in Table C given below.

TABLE C

| Spacing dx (Å) | Relative Intensity I/Io |
|---|---|
| 7.5–6.8 | 60–120 |
| 3.7–3.5 | 40–70 |
| 2.7–2.6 | 100 |
| 2.5–2.4 | 50–80 |
| 1.6–1.5 | 30–60 |

Figure 3:
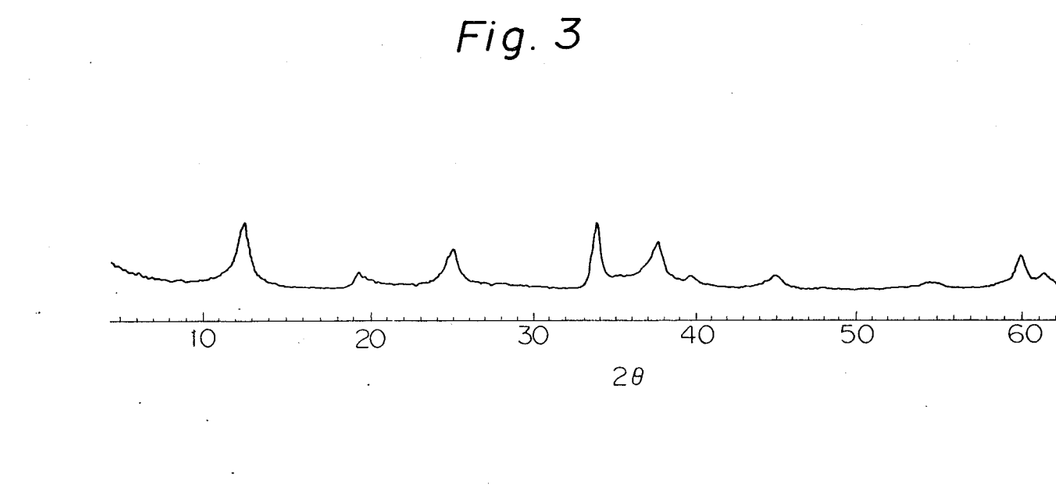
FIG. 3 shows an X-ray diffraction spectrum by Cu-Kα rays of aluminum-containing zinc phyllosilicate of the fraipontite type prepared in Example 8 of the present invention.

FIG. 3 of the accompanying drawings shows an X-ray diffraction spectrum of the microcrystalline synthetic fraipontite prepared according to the synthesis process (II).

The zinc phyllosilicate or aluminum-containing zinc phyllosilicate prepared according to the synthesis process (II) has a larger specific surface area than those of natural phyllosilicates of the two-layer structure, and the BET specific surface area is 20 to 160 m²/g, especially 40 to 140 m²/g.

Figure 4:
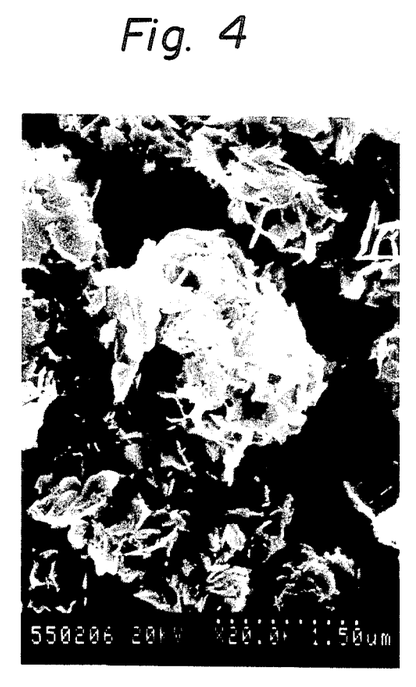
FIG. 4 is a scanning type electron microscope photograph (20,000 magnifications) showing the particle structure of aluminum-containing zinc phyllosilicate of the fraipontite type prepared in Example 8 of the present invention.

It is considered that the synthetic fraipontite prepared according to the synthesis process (II) consists of fine plate crystal particles, and these primary particles are aggregated to form secondary particles having an optional shape. FIG. 4 of the accompanying drawings is an electron microscope photograph showing the crystal structure of the fraipontite type mineral prepared in Example 8 (synthesis process (II)) given hereinafter. It is seen that secondary particles take a shape resembling that of a decorative paper ball. The particle size of this synthetic fraipontite varies in a broad range, and the median diameter determined according to the centrifugal sedimentation method is generally 0.5 to 20 μm and especially 1 to 10 μm.

Ordinarily, synthetic fraipontite minerals according to the synthesis processes (I) and (II) are obtained in a considerably bulky state, and the oil absorption is at least 80 ml/100 g, especially at least 100 to 180 ml/100 g, and the bulk density is in the range of from 0.2 to 0.6 g/cc.

Figure 5:
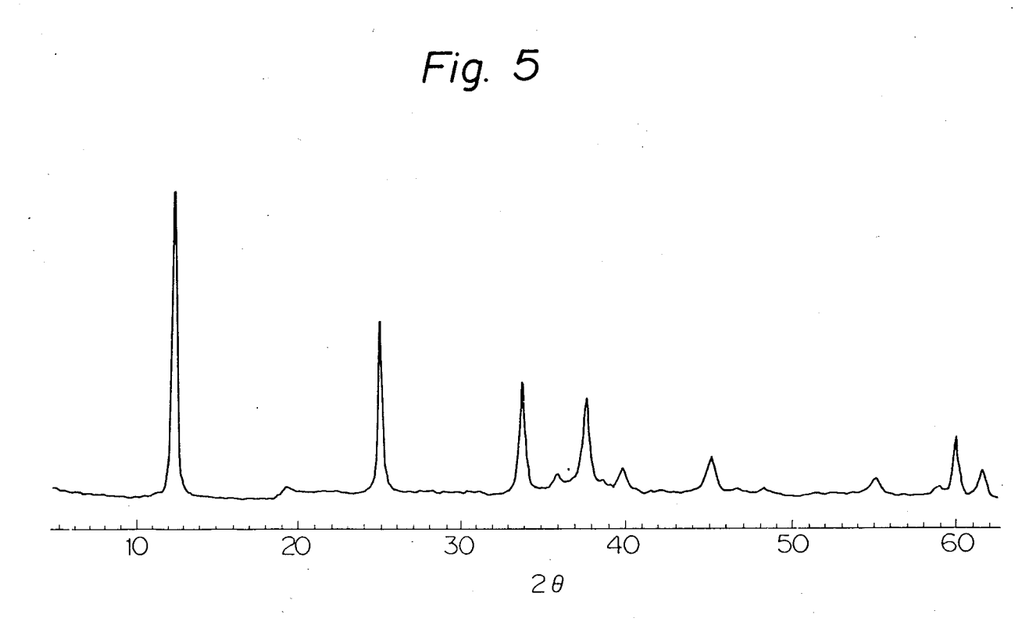
FIG. 5 shows an X-ray diffraction spectrum by Cu-Kα rays of an aluminum-containing zinc phyllosilicate mineral of the fraipontite type prepared in Example 18 of the present invention.

FIG. 5 of the accompanying drawings shows an X-ray diffraction pattern of a synthetic mineral prepared according to the synthesis process (III) of the present invention described hereinafter. It is seen that in the synthetic mineral prepared according to the synthesis process (III), the crystal structure of the fraipontite type is developed very well. The synthetic mineral prepared according to the synthesis process (III) has an X-ray diffraction pattern which is substantially the same as the X-ray diffraction pattern shown in Table D given below.

TABLE D

| Spacing (2θ) | Relative Intensity I/Io |
|---|---|
| 11–14 | 100 |
| 24–26 | 60 |
| 33–35 | 40 |
| 37–39 | 30 |
| 44–46 | 10 |
| 59–61 | 20 |

By "substantially the same" used herein, it is meant that the relative intensity of each peak can be changed within a range of ±15. The degree of development of the crystal structure, that is, the uniformity or regularity of the spacing, can be evaluated by the half-value width. In the synthetic mineral prepared according to the synthesis process (III), the half-value width, as $2\theta$, of each of the three strong peaks in the X-ray diffraction pattern shown in FIG. D is less than 0.5°, and the regularity of the spacing is excellent.

The synthetic mineral prepared according to the synthesis process (III) has a crystallization degree of at least 60%, especially at least 70%, as determined according to the following method.

(METHOD OF DETERMINATION OF CRYSTALLIZATION DEGREE)

(a) An X-ray diffraction curve of a sample is determined according to the powder X-ray diffractometry using Cu-Kα rays.

(b) The base line is formed by linearly connecting points of $2\theta=10°$ and $2\theta=63°$ on the diffraction curve. Incidentally, in the case where the point of $2\theta=10°$ is located above the lowest point in the range of from the point of $2\theta=10°$ to the point of $2\theta=20°$, the base line is formed by linearly connecting this lowest point and the point of $2\theta=63°$. Furthermore, in the case where the point of $2\theta=63°$ is located above the lowest point in the range of from the point of $2\theta=50°$ to the point of $2\theta=63°$, the base line is formed by using this lowest point.

(c) The amorphous line is formed by connecting lowest points in troughs between adjacent diffraction peaks (troughs where the distance between skirts of adjacent peaks is smaller than 1° are excluded).

(d) The crystallization degree is calculated according to the following formula:

$$\text{Crystallization degree (\%)} = \frac{SC}{SA + SC} \times 100$$

wherein SA stands for the area between the base line and the amorphous line and SC stands for the area between the amorphous line and the diffraction curve.

Figure 6:
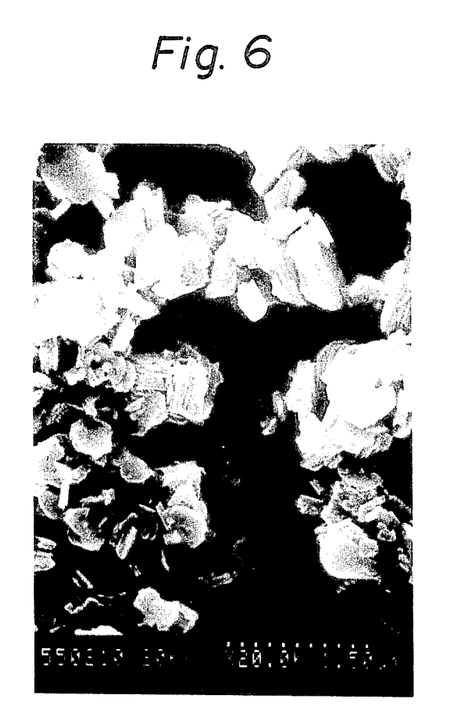
FIG. 6 is a scanning type electron microscope photograph (20,000 magnifications) showing the particle structure of an aluminum-containing zinc phyllosilicate mineral prepared in Example 18 of the present invention.

The synthetic mineral prepared according to the synthesis process (III) generally consists of lamellar plate crystals. FIG. 6 of the accompanying drawings is an electron microscope photograph showing the particle structure of a synthetic mineral obtained in Example 18 (synthesis process (III)). It is seen that the synthetic mineral of this type has a structure in which many plate-like crystallites are laminated. It is considered that the synthetic fraipontite mineral prepared according to the synthesis process (III) is clearly distinguishable over natural fraipontite in that the synthetic mineral of the present invention consists of laminated plate crystals while natural fraipontite consists of fibrous crystals as pointed out hereinbefore.

The synthetic mineral prepared according to the synthesis process (III) has an extraordinarily large specific surface area though it has a well-developed crystal structure. Ordinarily, a highly crystalline inorganic substance having a crystallization degree of at least 60% has a specific surface area smaller than 10 m$^2$/g. In contrast, the synthetic mineral prepared according to the synthesis process (III) has a specific surface area of at least 10 m$^2$/g, especially 40 to 180 m$^2$/g.

The particle size of the synthetic fraipontite prepared according to the synthetic process (III) varies in a broad range, and the median diameter determined by the centrifugal sedimentation method is generally 0.1 to 20 μm and especially 1 to 10 μm.

The synthetic fraipontite mineral according to the synthesis process (III) is ordinarily obtained in a considerably bulky state, and the oil absorption is generally at least 50 ml/100 g and especially 80 to 180 mμ/100 g. Furthermore, the bulk density is in the range of from 0.2 to 0.6 g/cc.

Since the synthetic fraipontite according to the present invention does not contain an impurity causing coloration and is microcrystalline irrespectively of the synthesis process, the whiteness is crystalline irrespectively of the synthesis process, the whiteness is very excellent and the Hunter whiteness is at least 80%, especially at least 90%. Especially, oxides and hydroxides are used as the starting materials in the synthesis processes (II) and (III), the synthetic minerals prepared according to these processes are advantageous in that inclusion ions and the like are not substantially contained.

SYNTHESIS PROCESSES

The fraipontite of the present invention is preferably prepared according to one of the following processes.

(SYNTHESIS PROCESS (I))

A microcrystalline fraipontite type silicate mineral is obtained by reacting a water-soluble silicate, a water-soluble zinc salt and a water-soluble aluminum salt in amounts corresponding to a three-component oxide composition comprising 5 to 45 mole% of SiO$_2$, 35 to 65 mole% of ZnO and 0 to 60 mole% of Al$_2$O$_3$ and, if necessary, heating the formed precipitate in the presence of water.

(SYNTHESIS PROCESS (II))

A synthetic fraipontite type silicate mineral is obtained by subjecting (a) silica, especially amorphous silica, or a silicon compound capable of forming said silica under reaction conditions, (b) zinc flower, zinc hydroxide or a zinc compound capable of forming zinc hydroxide under reaction conditions and (c) alumina hydrate, aluminum hydroxide or an aluminum compound capable of forming alumina hydrate or aluminum hydroxide in amounts corresponding to a three-component oxide composition comprising 5 to 45 mole% of SiO$_2$, 35 to 65 mole% of ZnO and 0 to 60 mole% of Al$_2$O$_3$ to hydrothermal reaction, if necessary in the presence of a salt of a basic nitrogen-containing compound with an acid.

(SYNTHESIS PROCESS (III))

A synthetic fraipontite silicate mineral is obtained by subjecting (a) crystalline silica, (b) zinc flower, zinc hydroxide or a zinc compound capable of forming zinc hydroxide under reaction conditions and (c) alumina hydrate, aluminum hydroxide or an aluminum compound capable of forming alumina hydrate or aluminum hydroxide under reaction conditions in amounts corresponding to a three-component oxide composition comprising 5 to 45 mole% of SiO$_2$, 35 to 65 mole% of ZnO and 2 to 60 mole% of Al$_2$O$_3$ to hydrothermal reaction in the presence of a salt a basic nitrogen-containing compound with an acid.

These processes will now be described in detail.

The reaction in the synthesis process (I) can be easily accomplished according to the so-called double decomposition method. In the case where an alkali metal silicate such as sodium silicate is used as the silica component, a water-soluble zinc salt such as zinc chloride, zinc nitrate or zinc sulfate is used as the ZnO component and sodium aluminate and/or a water-soluble aluminum salt such as aluminum chloride or aluminum sulfate is used as the alumina component, these components are mixed in the presence of water and reaction is accomplished by double decomposition.

In order to perform the double decomposition uniformly, there is adopted a method in which the silicate, the zinc salt and the aluminum salt and/or aluminate are simultaneously added into water to effect reaction.

The double decomposition reaction is sufficiently advanced at room temperature, but the reaction can be carried out under heating at a temperature of up to about 95° C. It is preferred that at the simultaneous addition reaction, the pH value of the reaction mixture be maintained at 5 to 10, especially 6 to 9. Accordingly, if necessary, an acid or alkali is added to the reaction mixture to maintain the pH value within the above-mentioned range.

By the simultaneous addition, a precipitate of a compound having a composition corresponding substantially to the above composition is formed. It is confirmed that this precipitate already has an X-ray diffraction pattern of the fraipontite type.

In order to further develop the crystal structure of the fraipontite type, it is preferred that the mother liquor containing this precipitate be heat-treated at a temperature of 50° to 110° C., especially 70° to 95° C., for 0.5 to 5 hours. It must be noted that if this heat treatment is carried out at a high temperature exceeding the above range, the formed precipitate is readily converted to willemite or hemimorphite, resulting in formation of a by-product.

After the heat treatment, the precipitate is recovered by filtration, washed with water, dried, pulverized and subjected to a post treatment such as sieving, whereby a product of the present invention is obtained.

In the synthesis process (II), as the silicon component, there can be used amorphous silica such as silica gel, silica hydrogel or silica hydrosol, amorphous solid silicic acid obtained according to the wet method or the dry method, shirasu, and active silicic acid obtained by an acid treatment of a clay. Furthermore, a silicon compound capable of forming amorphous silica under reaction conditions, for example, an easily hydrolyzable silicon compound such as ethyl silicate, can be used in the synthesis process (II).

Zinc flower and zinc hydroxide are preferably used as the zinc component. Of course, fresh zinc hydroxide formed by hydrolysis of a water-soluble zinc salt such as zinc chloride, zinc nitrate or zinc sulfate can also be used for the reaction, and there may be adopted a method in which the above-mentioned hydroxide is formed in the reaction system and used for the reaction.

Alumina hydrate and aluminum hydroxide are preferably used as the aluminum component. There are many views concerning the distinction between alumina hydrate and aluminum hydroxide. In the instant specification, the compound in which the characteristic absorption of the hydroxyl group is observed in the infrared absorption spectrum is called "aluminum hydroxide", and the compound in which only a broad absorption attributed to the presence of water is observed is called "alumina hydrate". As the alumina hydrate or aluminum hydroxide, there can be mentioned $Al(OH)_3$ such as gibbsite and bayerite, $AlO\cdot OH$ such as boehmite and diaspore, and boehmite gel (hydration degree of 1.5 to 2.0). Furthermore, amorphous aluminum hydroxide can be used for attaining the objects of the present invention. Moreover, an aluminum compound that can be hydrolyzed in the reaction system, for example, an aluminum alkoxide, can be used in the synthesis process (II).

Instead of the method in which the above-mentioned three components are subjected to the hydrothermal treatment, there may be adopted a method in which an amorphous composite oxide or hydroxide or coprecipitate of at least two components is formed in advance and is used for the reaction. For example, amorphous zinc silicate, amorphous aluminum silicate, amorphous aluminum hydroxide/zinc hydroxide coprecipitate, amorphous zinc aluminosilicate or an amorphous coprecipitate of the the components may be prepared and subjected to the hydrothermal treatment.

It is preferred that the three components be used in such amounts that the three-component oxide composition comprises 5 to 45 mole%, especially 20 to 40 mole%, of $SiO_2$, 35 to 65 mole%, especially 45 to 60 mole%, of ZnO, and 0 to 60 mole%, especially 5 to 30 mole%, of $Al_2O_3$.

The hydrothermal treatment may be carried out by using a reaction slurry comprising the above-mentioned three components. For example, if an as-formed fresh hydroxide or composite hydroxide is used as at least one reactant, a fraipontite type mineral having a relatively well-developed crystal structure can be obtained.

However, if a salt of a basic nitrogen-containing compound with an acid is made present in the reaction mixture, a synthetic fraipontite mineral having a relatively well-developed crystal structure can be synthesized irrespectively of the starting materials used.

By the basic nitrogen-containing compound is meant an inorganic or organic compound containing a nitrogen atom in the form of ammonium, amine, hydrazone or quanidine, and this compound is used in the form of a neutral salt with an acid or an acid addition salt. If the basic nitrogen-containing compound, which is not in the form of a salt, is used, no substantial effect of promoting crystallization to the fraipontite structure is attained.

Examples of the basic nitrogen-containing compound salt will now be described, though salts that can be used in the present invention are not limited to those mentioned below.

AMMONIUM TYPE

Ammonium salts of inorganic and organic acids such as ammonium sulfate, ammonium nitrate, ammonium chloride, ammonium phosphate, ammonium acetate and ammonium propionate.

AMINE TYPE

Acid addition salts of primary, secondary and tertiary amines, such as monoethanolamine hydrochloride, diethanolamine hydrochloride, triethanolamine hydrochloride, monoethylamine hydrochloride, diethylamine hdyrochloride, triethylamine hydrochloride, morpholine hydrochloride, pyridine hydrochloride, piperazine hydrochloride, piperidine hydrochloride, aniline hydrochloride, di alin hydrochloride and ethylenediamine hydrochloride.

HYDRAZINE TYPE

Hydrazine hydrochloride, methylhydrazine hydrochloride and hydrazine dihydrochloride.

GUANIDINE TYPE

Guanidine hydrochloride and gaunidine phosphate.

Among these salts, ammonium salts of mineral acids such as ammonium sulfate and ammonium chloride are preferred because they are easily available and cheap.

It is preferred that the basic nitrogen-containing compound be present in an amount of 10 to 300 mole%, especially 20 to 150 mole%, based on the zinc component. In the pesent invention, by making the basic nitrogen-containing compound present in the reaction mixture, a fraipontite type crystal structure is formed efficiently at the hydrothermal treatment. Though the reason has not been elucidated, it is presumed that the basic nitrogen-containing compound may form between this compound and the starting zinc material a complex compound capable of facilitating formation of an octahedron layer of $ZnO_6$.

The solid concentration in the aqueous slurry for the hydrothermal synthesis is not particularly critical, but from the viewpoint of the operation adaptability and from the economical viewpoint, it is preferred that the solid concentration in the aqueous slurry be 3 to 30% by weight, especially 5 to 20% by weight. It is preferred that the hydrothermal treatment be carried out at a temperature of 110° to 300° C., especialy 140° to 200° C., under a pressure of 0.5 to 87 kg/cm$^2$ (gauge), especialy 2.5 to 15 kg/cm$^2$ (gauge). A reaction time of 3 to 24 hours is generally sufficient under the above conditions.

The obtained product is separated from the mother liquor and washed with water, and if necessary, the washed product is dried to obtain an intended product. Incidentally, the mother liquor left after the separation of the product contains substantially the basic nitrogen-containing compound alone. Accordingly, this mother liquor can be used for the reaction of the next cycle again.

In the synthesis process (III) of the present invention, the hydrothermal reaction is carried out in the same manner as in the above-mentioned synthesis process (II) except that crystalline silica is used as the starting silicic acid component and a salt of a basic nitrogen-containing compound with an acid is present in the reaction mixture. The hydrothermal reaction in the presence of this salt exerts an effect of developing the crystal structure, and a fraipontite type mineral having a higher crystallization degree can be obtained by using crystalline silica as the starting silica material than by using amorphous silica.

Various crystalline silicas are shown, and for example, quartz, cristobalite and tridymite can be mentioned. Any of these known crystalline silicas may be used, but cristobalite is especially preferred. Either natural crystalline silica or synthetic crystaline silica may be used in the present invention. Namely, not only natural cristobalite but also synthetic cristobalite obtained by calcining diatomaceous earth or synthetic amorphous silica may be used in the synthesis process (III) of the present invention.

Other starting materials and reaction conditions may be the same as in the synthesis process (II).

USES

Since the synthetic fraipontite of the present invention consists of aluminum-containing zinc phyllosilicate, it has characteristics of a solid acid. Furthermore, the synthetic fraipontite of the present invention has a high surface activity represented by a specific surface area of at least 10 m$^2$/g and is excellent in the whiteness.

By dint of these characteristic properties, when the product of the present invention falls in contact with a leuco dye, it shows a prominently excellent color-developing property, and the product of the present invention can be valuably used as a color developer for a pressure-sensitive recording paper or an assistant of an organic color developer.

Since the synthetic fraipontite of the present invention comprises as the basic structure a two-layer structure of a layer of a tetrahedron of acidic $SiO_4$ and a layer of an octahedron of basic $ZnO_6$, which are bonded together, it has such a surprising characteristic that it shows an adsorbing property to not only basic dyes but also acidic dyes. By utilizing this characteristic, the synthetic fraipontite type mineral of the present invention can be advantageously used for formation of an ink-receiving layer of an ink jet recording medium.

The present invention will now be described in detail with reference to the following examples that by no means limit the scope of the invention.

The test methods adopted in the examples will now be described.

1. X-RAY DIFFRACTOMETRY

The apparatus used for the X-ray diffractometry was one supplied by Rigaku Denki K. K. (equipped with X-ray generating device Model 4036A1, goniometer Model 2125D1 and counter model 5071). The diffraction conditions were as follows.

Target: Cu
Filter: Ni
Detector: SC
Voltage: 35 KVP
Current: 15 mA
Count full scale: 8000 c/s–10000 c/s
Time constant: 1 second
Scanning speed: 2°/min
Chart speed: 2 cm/min
Emission angle: 1°
Slit width: 0.3 mm
Glancing angle: 6°

2. HUNTER WHITENESS

In the examples, the Hunter whiteness was measured by using an automatic reflection meter Model TR-600 supplied by Tokyo Denshoku K. K.

3. BET SPECIFIC SURFACE AREA (SA)

The specific surface area of each powder was measured according to the so-called BET method utilizing adsorption of nitrogen gas. This method is described in detail in S. Brunauer, P. H. Emmett and E. Teller, J. Am. Chem. Soc., Volume 60, 309 (1938).

In the examples, 0.5 to 0.6 g of a sample dried at 150° C. in advance was charged in a weighing bottle and dried for 1 hour in a thermostat drier maintained at 150° C., and immediately, the weight was precisely measured. The sample was charged in an adsorption sample tube and heated at 200° C., and the tube was evacuated so that the vacuum degree in the tube was 10$^{-4}$ mmHg.

After natural cooling, the sample tube was placed in liquefied nitrogen maintained at about −196° C. and the amount adsorbed of $N_2$ gas was measured at 4 to 5 points where the value of $pN_2/po$ was in the range of from 0.05 to 0.30 ($pN_2$ stands for the nitrogen gas pressure and po stands for the atmospheric pressure at the time of the measurement). The amount adsorbed of $N_2$ gas, from which the dead volume was subtracted, was converted to the adsorption amount at 0° C. under 1 atmosphere, and the absorption amount was substituted in the BET equation to obtain Vm (cc/g) (the amount absorbed of nitrogen gas necessary for formation of a monomolecular layer on the sample surface). The specific surface area was calculated according to the following formula:

$$SA(m^2/g) = 4.35 \times Vm$$

EXAMPLE 1

In water were dissolved 109 g of sodium silicate No. 3 ($SiO_2$ content=22.0%, $Na_2O$ content=7.0%) and 94 g of sodium hydroxide (2.35 moles of NaOH) so that the total amount was 1 liter. This solution was designated as "solution A" (0.4 mole of $SiO_2$). Separately, 95 g of zinc chloride (anhydride) and 97 g of aluminum chloride (hexahydrate) were dissolved in water so that the total amount was 1 liter. The solution was designated as "solution B" (0.7 mole of ZnO and 0.2 mole of $Al_2O_3$). A beaker having a capacity of 5 l was charged with 1 l of water, and the solutions A and B were simultaneously poured into water with stirring. The feed rate of each solution was 25 cc/min. After completion of the simultaneous addition, the pH value of the liquid reaction mixture was 6.9. Stirring was further conducted, and aging was carried out for 30 minutes and the mixture was heated at 85° to 90° C. on a water bath for 2 hours. The liquid reaction mixture was subjected to suction filtration and the solid was washed with water and dried at 110° C. The obtained cake was pulverized by a small shock pulverizer (sample mill) and coarse particles were removed by air sieving to obtain a white fine powder.

EXAMPLES 2 THROUGH 6

Solutions A and B were prepared in the same manner as described in Example 1 except that the amounts of sodium silicate No. 3, sodium hydroxide, zinc chloride and aluminum chloride were changed as shown in Table 1. The subsequent treatments were carried out in the same manner as described in Example 1.

TABLE 1

|  | Example 2 | Example 3 | Example 4 | Example 5 | Example 6 |
|---|---|---|---|---|---|
| Solution A | | | | | |
| sodium silicate No. 3 | 57 g | 139 g | 41 g | 20 g | 164 g |
| (mole of $SiO_2$) | (0.21) | (0.51) | (0.15) | (0.07) | (0.6) |
| sodium hydroxide | 120 g | 88 g | 140 g | 153 g | 57 g |
| (mole of NaOH) | (3.00) | (2.20) | (3.50) | (3.83) | (1.43) |
| Solution B | | | | | |
| zinc chloride (anhydride) | 106 g | 65 g | 61 g | 51 g | 123 g |
| (mole of ZnO) | (0.78) | (0.48) | (0.45) | (0.37) | (0.9) |
| aluminum chloride (hexahydrate) | 126 g | 126 g | 217 g | 253 g | — |
| (mole of $Al_2O_3$) | (0.26) | (0.26) | (0.45) | (0.52) | (—) |
| pH Value after Spontaneous Addition | 6.5 | 8.6 | 7.1 | 7.5 | 6.1 |

EXAMPLE 7

In water were dissolved 77 g of sodium silicate No. 1 solution (35.0% of $SiO_2$ and 17.5% of $Na_2O$) and 24 g of sodium hydroxide (0.6 mole of NaOH) so that the total amount was 1 liter. The solution was designated as "solution C" (0.45 mole of $SiO_2$). Separately, 216 g of zinc sulfate (heptahydrate) was dissolved in water so that the total amount was 1 liter. The solution was designated as "solution D" (0.75 mole of ZnO). Furthermore, 75 g of a sodium aluminate solution (20.5% of $Al_2O_3$ and 19.5% of $Na_2O$) was dissolved in water so that the total amount was 1 liter. The solution was designated as "solution E" (0.15 mole of $Al_2O_3$). A beaker having a capacity of 5 l was charged with 1 l of water, and the solutions C, D and E were simultaneously added with stirring. The feed rate of each solution was 25 cc/min. After termination of the simultaneous addition, the pH value of the liquid reaction mixture was 7.0. The liquid reaction mixture was subjected to suction filtration, and the recovered solid was washed with water and dried at 110° C. The obtained cake was pulverized by a small shock pulverizer, and coarse particles were removed by air sieving to obtain a white fine powder.

The three-component composition, Hunter whiteness, specific surface area and X-ray diffraction analysis results of each of the powders obtained in Examples 1 through 7 are shown in Table 2.

TABLE 2

| Example No. | Three-Component Composition (Starting Materials) | | | Hunter Whiteness | BET Specific Surface Area ($m^2/g$) | Fraipontite Type X-Ray Diffraction Pattern |
|---|---|---|---|---|---|---|
| | $SiO_2$ (mole %) | ZnO (mole %) | $Al_2O_3$ (mole %) | | | |
| 1 | 31 | 54 | 15 | 95 | 210 | observed |
| 2 | 17 | 62 | 21 | 97 | 196 | observed |
| 3 | 41 | 38 | 21 | 88 | 205 | observed |
| 4 | 14 | 43 | 43 | 94 | 196 | observed |
| 5 | 7 | 39 | 54 | 94 | 192 | observed |
| 6 | 40 | 60 | 0 | 95 | 145 | observed |
| 7 | 33 | 56 | 11 | 93 | 218 | observed |

EXAMPLE 8

In a beaker having a capacity of 1 l, 16 g (0.3 mole) of ammonium chloride was dissolved in water to form 0.6 l of an aqueous solution. Then, 13 g of finely divided silica (0.2 mole of $SiO_2$), 24 g of zinc oxide (0.3 mole) and 14 g of boehmite gel (0.1 mole of $Al_2O_3$) were added to the aqueous solution and the mixture was stirred. The slurry was charged in an autoclave having a capacity of 1 l and hydrothermal synthesis reaction was carried out at 160° C. with stirring at 300 rpm for 3 hours. After cooling, the reaction mixture was taken out from the autoclave and subjected to suction filtration, and the recovered solid was washed with water and dried at 110° C. The obtained dry cake was pulverized by a sample mill, and course particles were removed by air sieving to obtain a white powder. Thus, aluminum-containing zinc phyllosilicate of the fraipontite type having a two-layer structure was obtained.

EXAMPLE 9

A beaker having a capacity of 1 l was charged with 600 ml of water, and 16 g (0.3 mole) of monoethylamine and 30 g (0.3 mole) of hydrochloric acid were added thereto. Then, 13 g of finely divided silica (0.2 mole of $SiO_2$), 24 g of zinc oxide (0.3 mole) and 14 g of boehmite gel (1 mole of $Al_2O_3$) were added and the mixture was stirred. This slurry was charged in an autoclave having a capacity of 1 l, and hydrothermal synthesis reaction was carried out at 160° C. with stirring at 300 rpm for 3 hours. After cooling, the reaction mixture was taken out from the autoclave and subjected to suction filtration, and the recovered solid was washed with water and dried at 110° C. The obtained dry cake was pulverized by a sample mill and rough particles were removed by air sieving to obtain a white powder. Thus, aluminum-containing zinc phyllosilicate of the fraipontite type having a two-layer structure was obtained.

EXAMPLE 10

In a beaker having a capacity of 1 l, water was added to 16 g (0.3 mole) of ammonium chloride to form 0.6 l of an aqueous solution. Then, 13 g of finely divided silica (0.2 mole of $SiO_2$), 24 g (0.3 mole) of zinc oxide and 16 g (0.3 mole) of aluminum hydroxide (Higilite H-42M supplied by Showa Keikinzoku K.K.) were added to the solution, and the mixture was stirred. The slurry was charged in an autoclave having a capacity of 1 l and hydrothermal synthesis reaction was carried out at 160° C. with stirring at 300 rpm for 9 hours. After cooling, the reaction mixture was taken out from the autoclave and subjected to suction filtration, and the recovered solid was washed with water and dried at 110° C. The obtained dry cake was pulverized by a sample mill and coarse particles were removed by air sieving to obtain a white powder. Thus, aluminum-containing zinc phyllosilicate of the fraipontite type having a two-layer structure was obtained.

EXAMPLE 11

In a beaker having a capacity of 1 l, water was added to 20 g (0.15 mole) of ammonium sulfate to form 0.6 l of an aqueous solution. Then, 13 g of active silicic acid obtained by treating acid clay with sulfuric acid (Silton A supplied by Mizusawa Industrial Chemicals, Ltd.) (0.2 mole of $SiO_2$), 24 g (0.3 mole) of zinc oxide and 16 g (0.2 mole) of aluminum hydroxide (Higilite H-42M supplied by Showa Keikinzoku K.K.) were added to the solution and the mixture was stirred. The slurry was charged in an autoclave having a capacity of 1 l and subjected to hydrothermal synthesis reaction at 160° C. with stirring at 300 rpm for 9 hours. After cooling, the reaction mixture was taken out from the autoclave and subjected to suction filtration and the recovered solid was washed with water and dried at 110° C. The obtained dry cake was pulverized by a sample mill and coarse particles were removed by air sieving to obtain a white powder. Thus, aluminum-containing zinc phyllosilicate of the fraipontite type having a two-layer structure was obtained.

EXAMPLES 12 THROUGH 16

The procedures of Example 8 were repeated in the same manner except that as the salt of the basic nitrogen-containing compound with the acid, there was used 0.3 mole of ammonium fluoride (Example 12), ammonium acetate (Example 13), triethylamine and hydrochloric acid (Example 14), pyridine and hydrochloric acid (Example 15) or triethanolamine and hydrochloric acid (Example 16) instead of ammonium chloride (0.3 mole). In each case, aluminum-containing zinc phyllosilicate of the fraipontite type having a two-layer structure was obtained.

EXAMPLE 17

In water were dissolved 109 g of zinc chloride (anhydride) and 97 g of aluminum chloride (hexahydrate) to form 0.4 l of a solution. This solution was designated as "solution A" (0.72 mole of ZnO and 0.2 mole of $Al_2O_3$). Separately, 100 g of sodium hydroxide (2.5 moles of NaOH) was dissolved in water to form 0.4 l of a solution. The solution was designated as "solution B". A beaker having a capacity of 3 l was charged with 1 l of water, and the solutions A and B were simultaneously added to water with stirring. The feed rate of each solution was 10 cc/min. After the simultaneous addition, the pH value of the reaction mixture was 10.0. Stirring was further conducted and the mixture was heated at 90° C. for 2 hours. The liquid reaction mixture was subjected to suction filtration, and the recovered solid was washed with water to obtain a cake. An autoclave having a capacity of 1 l was charged with the obtained cake and 31 g of finely divided silica (Mizukasil P-526N supplied by Mizusawa Industrial Chemcials, Ltd.) (product dried at 110° C.; 0.5 mole of $SiO_2$), and water was added so that the total amount was 600 ml. Hydrothermal synthesis reaction was carried out at 160° C. with stirring at 300 rpm for 3 hours. After cooling, the reaction mixture was taken out from the autoclave and water was removed by filtration, and the recovered solid was dried at 110° C. The dry cake was pulverized by a sample mill and coarse particles were removed by air sieving to obtain a white fine powder. Thus, aluminum-containing zinc phyllosilicate of the fraipontite type having a two-layer structure was obtained.

The Hunter whiteness, specific surface area and results of the X-ray diffraction analysis of each of the powders obtained in Examples 8 through 17 are shown in Table 3.

TABLE 3

| Example No. | Kind of Added Salt | Hunter Whiteness (%) | BET Specific Surface Area ($m^2/g$) | X-Ray Diffraction Pattern of Fraipontite Type |
|---|---|---|---|---|
| 8 | ammonium chloride | 96 | 41 | observed |
| 9 | monoethylamine hydrochloride | 96 | 102 | observed |
| 10 | ammonium chloride | 95 | 48 | observed |
| 11 | ammonium sulfate | 90 | 73 | observed |
| 12 | ammonium fluoride | 96 | 98 | observed |
| 13 | ammonium acetate | 96 | 92 | observed |
| 14 | triethylamine hydrochloride | 96 | 56 | observed |
| 15 | pyridine hydrochloride | 96 | 51 | observed |
| 16 | triethanolamine hydrochloride | 96 | 51 | observed |
| 17 | not added | 97 | 133 | observed |

EXAMPLE 18

In a beaker having a capacity of 1 l, water was added to 16 g (0.3 mole) of ammonium chloride to form 0.6 l of an aqueous solution. Then, 12 g of diatomaceous earth (cristobalite type silica supplied by Showa Kagaku Kogyo K.K.) (0.2 mole of $SiO_2$), 24 g (0.3 mole) of zinc oxide and 14 g of boehmite gel (0.1 mole of $Al_2O_3$) were added to the solution, and the mixture was stirred. The slurry was charged in an autoclave having a capacity of 1 l and hydrothermal synthesis reaction was carried out at 180° C. with stirring at 300 rpm for 6 hours. After cooling, the reaction mixture was taken out from the autoclave and subjected to suction filtration, and the recovered solid was washed with water and dried at 110° C. The obtained dry cake was pulverized by a sample mill and coarse particles were removed by air sieving to obtain a white powder.

Thus, aluminum-containing zinc phyllosilicate of the fraipontite type having a two-layer structure was obtained.

EXAMPLE 19

To 1 kg of a roughly pulverized product (having a water content of 35%) of acid clay produced at Hosogoe, Higashikanbara-gun, Niigata prefecture, Japan (about 60% of cristobalite and about 2% of quartz on the dry basis) was added 3 kg of 25% sulfuric acid, and the mixture was heated at 95° C. for 10 hours and subjected to filtration to remove the treating liquid. Then, 3 kg of 25% sulfuric acid was added to the residue again, and the mixture was heated at 95° C. for 10 hours to effect a heat treatment. The reaction product was washed with water by filtration to obtain a cake. The obtained cake was charged in a pot mill and water was added, and wet pulverization was carried out together with siliceous sand (quartz). The upper suspension was thrown away 3 times by water sieving, and a slurry containing 10% of $SiO_2$ was recovered from the residual precipitate.

Then, in a beaker having a capacity fo 1 l, water was added to 20 g (0.15 mole) of ammonium sulfate to form 0.6 l of an aqueous solution, and 120 g (0.2 mole of $SiO_2$) of the above slurry containing 10% of silica (about 80% of cristobalite and about 3% of quartz were contained based on the total silica), 24 g (0.3 mole) of zinc oxide and 16 g (0.2 mole) of aluminum hydroxide (Higilite H-42M supplied by Showa Keikinzoku K.K.) were added to the solution and the mixture was stirred. The obtained slurry was charged in an autoclave having a capacity of 1 l and hydrothermal synthesis reaction was carried out at 180° C. with stirring at 300 rpm for 6 hours. After cooling, the reaction mixture was taken out from the autoclave and subjected to suction filtration, and the recovered solid was washed with water and dried at 110° C. The obtained dry cake was pulverized by a sample mill and coarse particles were removed by air sieving to obtain a white powder. Thus, aluminum-containing zinc phyllosilicate of the fraipontite type having a two-layer structure was obtained.

EXAMPLE 20

The procedures of Example 18 were repeated in the same manner as in Example 18 except that hydrothermal reaction was carried out at 200° C. for 24 hours (conditions of 180° C. and 6 hours were adopted in Example 18). Thus, aluminum-containing zinc phyllosilicate of the fraipontite type having a two-layer structure was obtained.

The Hunter whiteness, specific surface area and results of the X-ray diffraction analysis of each of the powders obtained in Examples 18 through 20 are shown in Table 4.

TABLE 4

| | Whiteness (%) | Specific Surface Area ($m^2/g$) | X-Ray Diffraction Analysis | | | Crystallization Degree (%) |
|---|---|---|---|---|---|---|
| | | | Diffraction Pattern | | Half-Value Widths (°) of Three Strong Peaks | |
| | | | Spacing (2θ) | Relative Intensity (I/Io) | | |
| Example 18 | 94 | 116 | 11–14 | 100 | 0.28 | 73 |
| | | | 24–26 | 57 | 0.28 | |
| | | | 33–35 | 36 | 0.34 | |
| | | | 37–39 | 28 | — | |
| | | | 44–46 | 10 | — | |
| | | | 59–61 | 19 | — | |
| Example 19 | 90 | 83 | 11–14 | 100 | 0.30 | 65 |
| | | | 24–26 | 55 | 0.30 | |
| | | | 33–35 | 37 | 0.38 | |
| | | | 37–39 | 30 | — | |
| | | | 44–46 | 11 | — | |
| | | | 59–61 | 20 | | |
| Example | 93 | 17 | 11–14 | 100 | 0.27 | 89 |

TABLE 4-continued

| | Whiteness (%) | Specific Surface Area (m²/g) | X-Ray Diffraction Analysis | | Half-Value Widths (°) of Three Strong Peaks | Crystallization Degree (%) |
|---|---|---|---|---|---|---|
| | | | Diffraction Pattern | | | |
| | | | Spacing (2θ) | Relative Intensity (I/Io) | | |
| | 20 | | 24–26 | 59 | 0.27 | |
| | | | 33–35 | 39 | 0.33 | |
| | | | 37–39 | 31 | — | |
| | | | 44–46 | 12 | — | |
| | | | 59–61 | 22 | — | |

We claim:

1. A process for the preparation of a synthetic fraipontite type mineral having a chemical structure represented by the formula $(Zn_{3-x}Al_x)(Si_{2-x}Al_x)\text{-}O_5(OH)_4$, wherein x is a number of from 0 to 1.75, which comprises heating an oxide or hydroxide mixture or coprecipitate having a three-component oxide composition comprising 5 to 45 mole % of $SiO_2$, 35 to 65 mole % of ZnO and 0 to 60 mole % of $Al_2O_3$ in the presence of water to form a crystal of the fraipontite type by crystallization.

2. A process for the preparation of a micro-crystalline fraipontite type silicate material having a chemical structure represented by the formula $(Zn_{3-x}Al_x)(Si_{2-x}Al_x)O_5(OH)_4$, wherein x is a number of from 0 to 1.75, which comprises reacting a water-soluble silicate, a water-soluble zinc solvent and a water-soluble aluminum salt and/or a water-soluble aluminate in amounts corresponding to a three-component oxide composition comprising 5 to 45 mole % of $SiO_2$, 35 to 65 mole % of ZnO and 0 to 60 mole % of $Al_2O_3$ in the presence of water under heating at a temperature of up to 95° C. and a pH of 5 to 10 for a time sufficient to form a crystal, and heat-treating a formed coprecipitate in the presence of water at a temperature of 50° to 110° C.

3. A process according to claim 2, wherein a solution of the water-soluble silicate is mixed with a solution containing the water-soluble zinc salt and the water-soluble aluminum salt to form a coprecipitate.

4. A process for the preparation of a synthetic fraipontite type material having a chemical structure represented by the formula $(Zn_{3-x}Al_x)(Si_{2-x}Al_x)\text{-}O_5(OH)_4$, wherein x is a number of from 0 to 1.75, which comprises subjecting (a) silica or a silicon compound capable of forming silica under reaction conditions, (b) zinc flower, zinc hydroxide or a zinc compound capable of forming zinc hydroxide under reaction conditions and (c) alumina hydrate, or aluminum hydroxide under reaction conditions in amounts corresponding to a three-component oxide composition comprising 5 to 45 mole % of $SiO_2$, 35 to 65 mole % of ZnO and 0 to 60 mole % of $Al_2O_3$ to hydrothermal reaction wherein reaction conditions comprise a temperature of 110° to 300° C. and a pressure of 0.5 to 87 kg/cm² for a time sufficient to form a crystal.

5. A process according to claim 4, wherein hydrothermal reaction is carried out in the presence of a salt of a basic nitrogen-containing compound with an acid.

6. A process according to claim 5, wherein said salt is an ammonium salt with a mineral acid.

7. A process according to claim 5, wherein said salt is made present in an amount of 10 to 300 mole% based on the zinc component.

8. A process for the preparation of a synthetic fraipontite type material having a chemical structure represented by the formula $(Zn_{3-x}Al_x)(Si_{2-x}Al_2)\text{-}O_5(OH)_4$, wherein x is a number of from 0 to 1.75, which comprises subjecting (a) crystalline silica, (b) zinc flower, zinc hydroxide or a zinc compound capable of forming zinc hydroxide under reaction conditions and (c) alumina hydrate, aluminum hydroxide or an aluminum compound capable of forming alumina hydrate or aluminum hydroxide under reaction conditions in amounts corresponding to a three-component oxide composition comprising 5 to 45 mole % of $SiO_2$, 35 to 65 mole % of ZnO, and 2 to 60 mole % of $Al_2O_3$ to hydrothermal reaction in the presence of a salt of a basic nitrogen-containing compound with an acid wherein reaction conditions comprise a temperature of 110° to 300° C. and a pressure of 0.5 to 87 kg/cm² for a time sufficient to form a crystal.

9. A process according to claim 8, wherein the crystalline silica is cristobalite type silica.

10. A process according to claim 8, wherein said salt is made present in an amount of 10 to 300 mole% based on the zinc component.

11. Crystalline synthetic fraipontite having a chemical structure represented by the formula:

$(Zn_{3-x}Al_2)(Si_{2-x}Al_x)O_5(OH)_4$ wherein x is a number of from 0 to 1.75, consisting of zinc phyllosilicate or aluminum-containing zinc phyllosilicate having the following X-ray diffraction pattern:

| Spacing dx (Å) | Relative Intensity I/Io |
|---|---|
| 8.4–6.4 | 40–70 |
| 3.9–3.5 | 40–70 |
| 2.7–2.6 | 100 |
| 2.5–2.4 | 50–80 |
| 1.6–1.7 | 50–80 | a Hunter whiteness of at least 80% and a specific surface area of at least 10 m²/g.

12. Microcrystalline synthetic fraipontite as set forth in claim 11, which has a specific surface area of at least 100 m²/g.

13. A synthetic fraipontite mineral having a chemical structure represented by the formula:

$(Zn_{3-x}Al_x)(Si_{2-x}Al_x)O_5(OH)_4$ wherein x is a number of from 0 to 1.75, consisting of aluminum-containing zinc phyllosilicate having lamellar plate-like crystals and having a Hunter whiteness of at least 80% and a specific surface area of at least 10 m²/g, said zinc phyllosilicate having the following X-ray diffraction pattern as determined by Cu-Kα rays:

| Spacing (2θ) | Relative Intensity I/Io |
| --- | --- |
| 11–14 | 85–115 |
| 24–26 | 45–75 |
| 33–35 | 25–55 |
| 37–39 | 15–45 |
| 44–46 | 0–25 |
| 59–61 | 5–35 | and the half-value width of each of the three strong peaks being less than 0.5° expressed as 2θ.

14. A process according to claim 2 wherein the pH value of the reaction mixture is maintained at 6 to 9.

15. A process according to claim 2 wherein the co-precipitate is heat treated at a temperature of 70° to 95° C. for 0.5 to 5 hours.

16. A process according to claim 4 wherein said reaction conditions comprise a temperature of 140° to 200° C., a pressure of 2.5 to 15 kg/cm² and a reaction time of 3 to 24 hours.

17. A process according to claim 8 wherein the hydrothermal reaction is conducted in an aqueous slurry having a solid concentration of 3 to 30% by weight.

18. A process according to claim 8 wherein said reaction conditions comprise a temperature of 140° to 200° C., a pressure of 2.5 to 15 kg/cm² and a reaction time of 3 to 24 hours.

* * * * *

UNITED STATES PATENT AND TRADEMARK OFFICE
CERTIFICATE OF CORRECTION

PATENT NO. : 4,626,420

DATED : December 2, 1986

INVENTOR(S) : KOICHI USUI, ET AL.

It is certified that error appears in the above-identified patent and that said Letters Patent is hereby corrected as shown below:

<u>On The Title Page</u>

[30] Foreign Application Priority Data

Add the following

--May 28, 1985 [JP]
Japan . . . . . . . .60-113116

May 28, 1985 [JP]
Japan . . . . . . . .60-113117 --

Signed and Sealed this

Seventeenth Day of February, 1987

*Attest:*

DONALD J. QUIGG

*Attesting Officer*     *Commissioner of Patents and Trademarks*